(12) United States Patent
Kumar et al.

(10) Patent No.: US 11,199,501 B2
(45) Date of Patent: Dec. 14, 2021

(54) METHODS AND SYSTEMS FOR IDENTIFYING FEATURES

(71) Applicant: UTICA LEASECO, LLC, Rochester Hills, MI (US)

(72) Inventors: Vineet Kumar, Mountain View, CA (US); Katayoun Zand, Los Gatos, CA (US); Howard Woo, San Jose, CA (US); Markelle L. Gibbs, San Jose, CA (US); Enrique Bravo Mora, Elk Grove, CA (US); Christopher E. France, Campbell, CA (US); Brendan M. Kayes, Los Gatos, CA (US)

(73) Assignee: UTICA LEASECO, LLC, Rochester Hills, MI (US)

( * ) Notice: Subject to any disclaimer, the term of this patent is extended or adjusted under 35 U.S.C. 154(b) by 0 days.

(21) Appl. No.: 16/657,271

(22) Filed: Oct. 18, 2019

(65) Prior Publication Data

US 2021/0116654 A1 Apr. 22, 2021

(51) Int. Cl.
| | |
|---|---|
| *G01N 21/64* | (2006.01) |
| *G01N 21/33* | (2006.01) |
| *G01N 21/47* | (2006.01) |
| *G02B 6/42* | (2006.01) |
| *H04N 5/33* | (2006.01) |
| *H01S 3/00* | (2006.01) |
| *G02B 6/293* | (2006.01) |

(52) U.S. Cl.
CPC ......... *G01N 21/6489* (2013.01); *G01N 21/33* (2013.01); *G01N 21/4738* (2013.01); *G02B 6/29311* (2013.01); *G02B 6/4215* (2013.01); *H01S 3/0007* (2013.01); *H04N 5/33* (2013.01)

(58) Field of Classification Search
None
See application file for complete search history.

(56) References Cited

U.S. PATENT DOCUMENTS

| | | | | |
|---|---|---|---|---|
| 2012/0224051 | A1* | 9/2012 | Yamane | G03F 1/84 348/131 |
| 2014/0146297 | A1* | 5/2014 | Vainer | G01N 21/95623 355/30 |
| 2015/0123014 | A1* | 5/2015 | Palomba | G01N 21/94 250/459.1 |
| 2019/0137776 | A1* | 5/2019 | Ryu | G01J 3/0208 |

OTHER PUBLICATIONS

International Search Report and Written Opinion issued in PCT/US2020/055624, dated Nov. 23, 2020, pp. 1-7.

* cited by examiner

*Primary Examiner* — Michelle M Iacoletti
(74) *Attorney, Agent, or Firm* — Arent Fox LLP (57) ABSTRACT

Aspects of the present disclosure include methods, apparatuses, and computer readable media for transmitting a light such that it is incident on a multi-layer stack, wherein the multi-layer stack includes the feature and a region without the feature, detecting a narrow-band light from the feature and the region without the feature, wherein the feature has a first optical response in response to a wavelength of the narrow-band light and the region without the feature has a second optical response in response to the wavelength of the narrow-band light, and generating, based on the narrow-band light, an image indicative of where the first optical response and the second optical response occur on the multi-layer stack.

19 Claims, 7 Drawing Sheets

METHODS AND SYSTEMS FOR IDENTIFYING FEATURES

BACKGROUND

Many modern high-technology devices such as semiconductors, photovoltaics, hard disk drives, and flat panels are fabricated using thin-film processing techniques. In thin-film processing, multiple, thin layers of different materials are sequential deposited, and sometimes patterned, to form a multi-layered stack. These layers are typically tightly controlled in thickness, composition and material properties, and thereby have consistent and controlled optical properties such as index of refraction and extinction coefficient or absorption. Furthermore, the thicknesses of these layers are commonly on the same order magnitude of the wavelength of visible light. As a result, such multi-layer stacks exhibit thin-film interference effects when illuminated by light.

Defects in thin-film devices may manifest as one or more missing layers of the multi-layer stack. This may occur, for example, when there is a growth failure during one step of a multi-step epitaxial growth or when there is an adhesion failure between layers resulting in delamination. Defects may also manifest as additional layers on the stack such as residue or surface contamination. Finally, defects may present as localized or large-scale shifts in the thickness or optical properties of one or more of the individual layers. The defects may reduce the performance of the multi-layer stack and/or the overall yield during the manufacturing process. It would be desirable to identify the defects in order to repair the defects and/or mitigate/reduce the impacts of the defects on the performance of the multi-layer stack. However, some defects may be difficult to identify because the defects may be invisible or substantially invisible, and/or the identification process may require arduous visual inspections. Further, defects may appear similar in colors to the surrounding materials to the naked eyes of an inspector, and may be nearly imperceptible. This may lead to incorrect or unnecessary remedial steps to be taken. Therefore, improvements in defect identification is desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In certain implementations, a method according aspects of the current disclosure may include transmitting a light such that it is incident on a multi-layer stack, wherein the multi-layer stack includes the feature and a region without the feature, detecting a narrow-band light from the feature and the region without the feature, wherein the feature has a first optical response in a narrow wavelength band of light and the region without the feature has a second optical response in the narrow wavelength band of light, and generating, based on the narrow-band light, an image indicative of where the first optical response and the second optical response occur on the multi-layer stack.

In some implementations, aspects of the present disclosure may include a method that selects the narrow wavelength band to be detected such that the difference between the first and second optical response is maximized.

In certain variations, an aspect of the present disclosure may include a method that selects multiple wavelengths exhibiting large differences between the first and second optical response, forms an image of the device at each wavelength, and performs image processing such as image division or subtraction to further enhance contrast between the feature and regions without the feature.

A system may include one or more light sources configured to transmit a light such that it is incident on a multi-layer stack, wherein the multi-layer stack includes the feature and a region without the feature, a detector configured to detect a narrow-band light from the feature and the region without the feature, wherein the feature has a first optical response in a narrow wavelength band of light and the region without the feature has a second optical response in the narrow wavelength band of light and an imaging system configured to generate, based on the narrow-band light, an image indicative of where the first optical response and the second optical response occur on the multi-layer stack.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In a multi-layer stack, such as a solar cell, some defects may be generated during the manufacturing process. Examples of the defects may include a delamination, a stain, an etch pit, a wrinkle, a fissure, a crack, a hole, an opening, a gap, a slit, a groove, a break, a fracture, a split, a fault, or other faults in the multi-layer stack. These defects may degrade the performance of the multi-layer stack and/or yield in the manufacturing process. In order to improve the performance and/or yield, the defects may need to be identified (e.g., detected, located) and removed if possible, or at the very least mitigated in some way. However, the defects resulting from the manufacturing process may be difficult to identify in the first place.

In some aspects of the present disclosure, a feature detection system may be applied to identify various features (e.g., defects) by capturing one or more narrow-band images (different wavelengths) of the multi-layer stack. In some instances, a narrow-band light may be a light having a full-width half-max of 0.1 nanometer (nm), 0.2 nm, 0.5 nm, 1 nm, 2 nm, 5 nm, 10 nm, 20 nm, 50 nm, etc. Based on the optical response (e.g. absorption, reflection, refraction, scattering, interference, and/or photoluminescence) of the region with a feature, certain narrow-band images of the multi-layer stack may show the feature better than broadband images of the multi-layer stack. In some instances, narrow-band images may exhibit higher contrast between the feature and a non-feature region. The narrow-band images may be used to identify the feature. Furthermore, more than one narrow-band image with different wavelengths, but spatially registered to each other, may be processed together by image subtraction, division, scaling or other processing methods to further enhance contrast between feature regions and non-feature regions to enhance feature detection capability. Alternatively or additionally, the shapes, sizes, colors, photo-luminescence, or other characteristics of the defects may be used to identify the features. In some examples, the techniques described in the current applications may be used to detect various features that are not defects, but exhibit different optical responses under different narrow-band lights.

Figure 1:
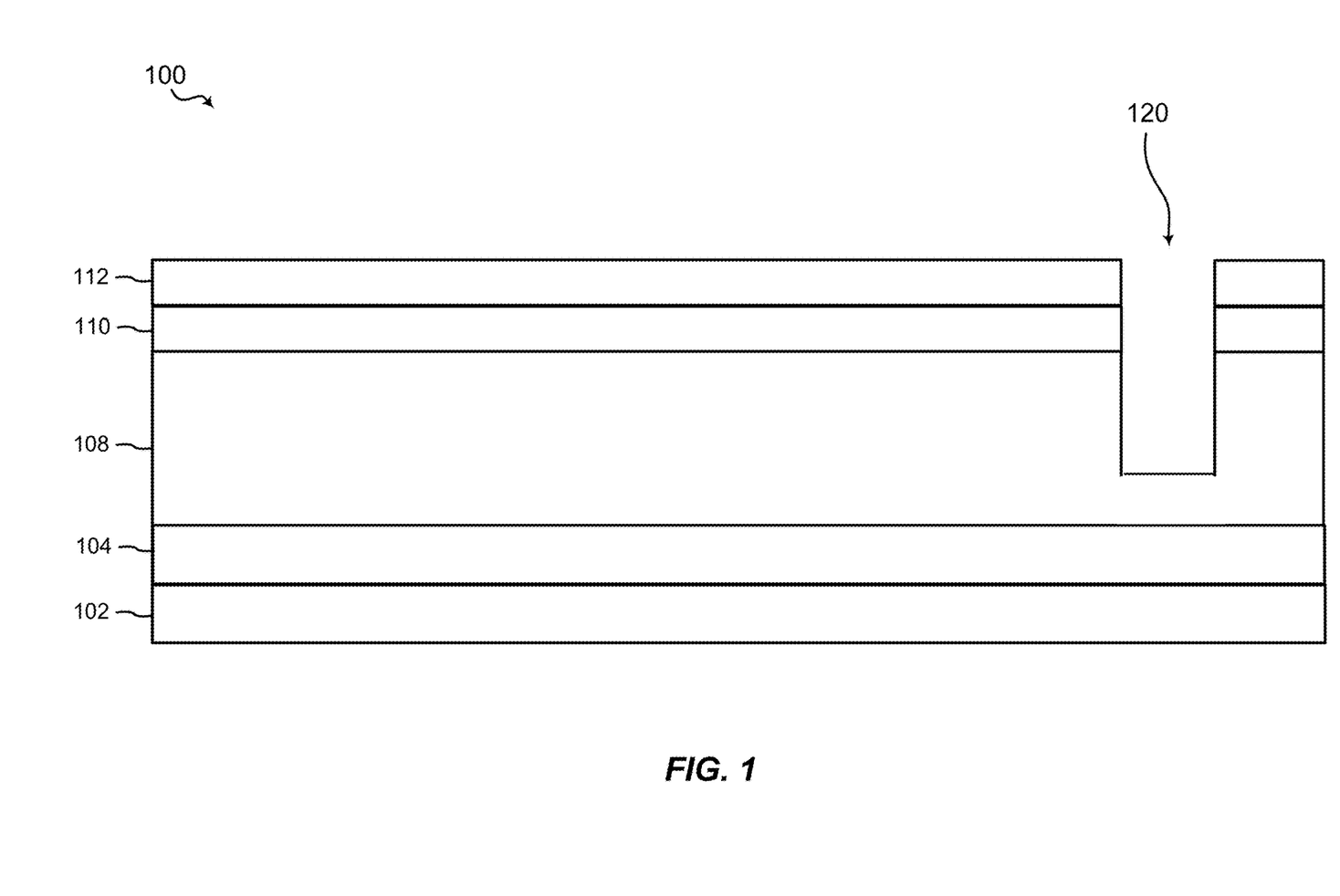
FIG. 1 is an example of a diagram of a multi-layer stack including one or more defects.

Referring to FIG. 1, in certain aspects, a multi-layer stack 100 may be a solar cell (also referred to as photovoltaic (PV) devices), a light emitting device, or other optical multi-layer stack, or a structure that is integral to any of these devices. In one example, the multi-layer stack 100 may be a single junction solar cell. In other examples, the multi-layer stack 100 may be a dual junction or a multi junction solar cell. The multi-layer stack 100 may include a handle 102. The handle 102 may be a plastic substrate, a heavily doped (P-type or N-type) silicon substrate, an intrinsic silicon substrate, an oxidized silicon substrate, a glass substrate, a sapphire substrate, or other substrates. The size (edge or diameter) of the handle 102 may be 1 inch, 2 inches, 4 inches, 6 inches, 10 inches, 12 inches, 15 inches, or other sizes. The multi-layer stack 100 may include one or more bottom electrodes 104. The one or more bottom electrodes 104 may include conductive materials such as metals including silver, gold, palladium, platinum, or other elemental metal materials or alloys. The one or more bottom electrodes 104 may include a carrier transport layer, a carrier injection layer, and/or a carrier extraction layer.

In some implementations, the multi-layer stack 100 may include a semiconductor layer 108. The semiconductor layer 108 may be a light absorbing semiconductor, such as gallium arsenide, gallium arsenide phosphide, gallium phosphide, aluminum gallium arsenide, aluminum gallium nitride, aluminum gallium indium phosphide, aluminum gallium indium nitride, aluminum gallium, aluminum phosphide, aluminum nitride, zinc selenide, indium gallium nitride, indium gallium arsenide, indium gallium phosphide, silicon carbide, or other elemental, molecular (e.g., II-VI or III-V compounds), or organic semiconductors. The semiconductor layer 108 may include an optional reflective layer with the one or more bottom electrodes 104. In some examples, the one or more bottom electrodes 104 may directly or indirectly contact the semiconductor layer 108.

In certain examples, the semiconductor layer 108 may include one or more defects 120. The one or more defects 120 may be etch pits, stains, wrinkles, de-laminations, fissures, cracks, holes, or other types imperfection in or around the semiconductor layer 108. The one or more defects 120 may be created during a manufacturing process, which may be one of an epitaxial lift-off process and/or an epitaxial growth of the semiconductor layer 108.

In alternative implementations, the semiconductor layer 108 may include features (instead of the one or more defects 120), such as deposited metals, semiconductors, or insulators. The features may include portions of layers within the multi-layer stack 100. The features may include contaminants deposited during the manufacturing process.

In some instances, the multi-layer stack 100 may include a window layer 110. The window layer 110 may include aluminum indium phosphide, for example, but may also be made of other materials. The window layer 110 may improve the carrier injection/transport process near the junction of the semiconductor layer 108.

In an aspect, the multi-layer stack 100 may include one or more top electrodes 112. The one or more top electrodes 112 may include gallium arsenide, indium tin oxide, aluminum doped zinc oxide, fluorine doped tin oxide, silver, gold, aluminum, or other materials.

Figure 2:
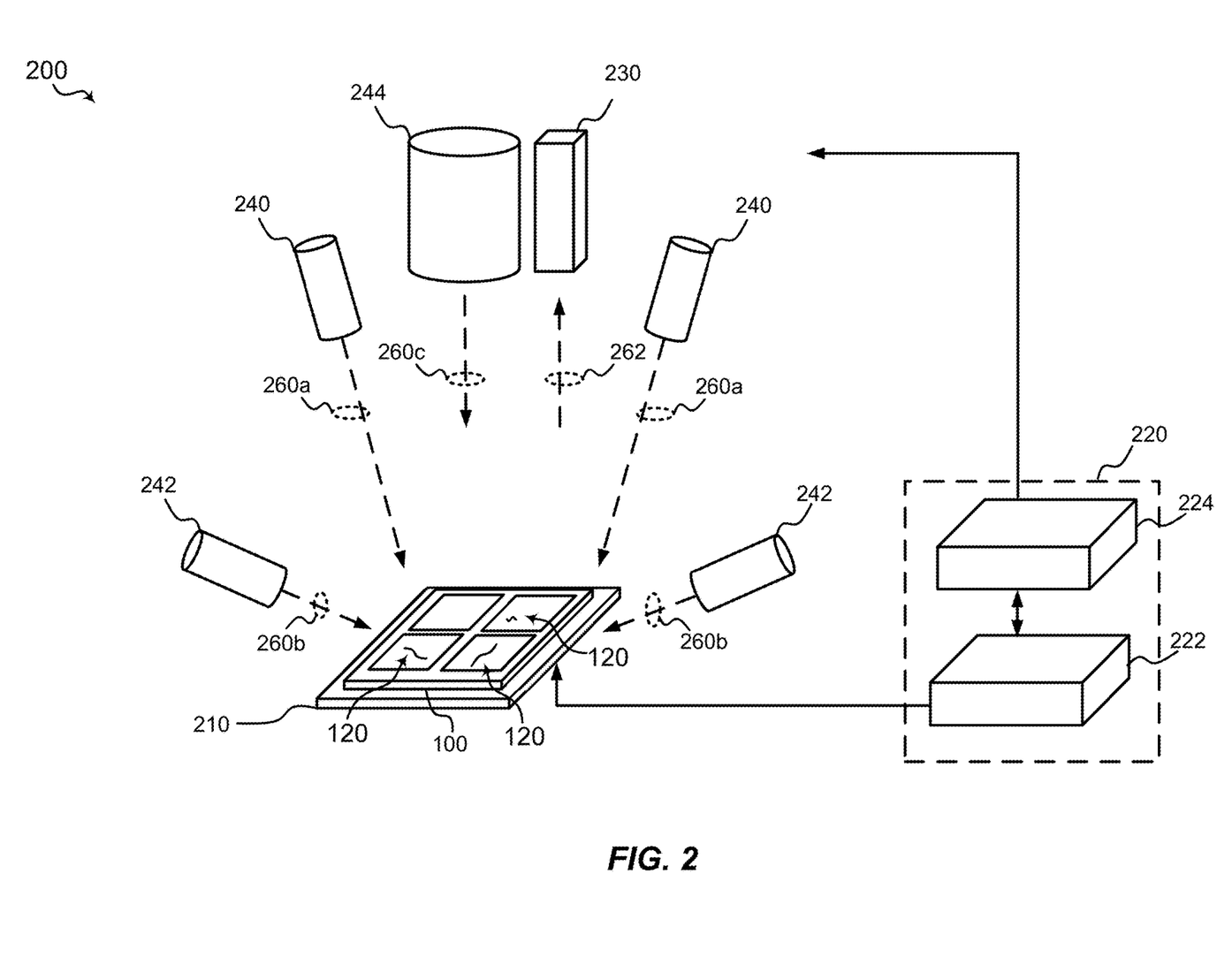
FIG. 2 is an example of a schematic diagram of an example of a defect identification system according to aspects of the present disclosure.

Referring now to FIG. 2, in some implementations, a defect identification system 200 may include a stage 210, a control system 220, a detector 230, and/or one or more light sources 240, 242, 244. The stage 210 may include linear actuators and rotational actuators (e.g., servomotor) to control the vertical and horizontal translations and angular rotation of the stage 210. The stage 210 may heat and/or cool the multi-layer stack 100 using heating coils and/or lower temperature gas such as liquid nitrogen or liquid helium. The control system 220 may include a stage controller 222 for transmitting signals, commands, and/or instructions to the stage 210 to control the translations and rotation of the stage 210. The control system 220 may include an imaging system 224 to control the detector 230 and/or the one or more light sources 240, 242, 244. The imaging system 224 may transmit signals, commands, and/or instructions to alter the output intensity of the one or more light sources 240, 242, 244, the wavelengths of the one or more light sources 240, 242, 244, the incident angles of lights 260 (by changing the tilt of the one or more light sources 240, 242, 244, for example) and vertical and horizontal translations and angular rotation of the one or more light sources 240. The imaging system 224 may control the detected wavelength, focus, sensitivity, field (dark or bright), or detection parameters of the detector 230. The imaging system 224 may detect patterns on the surface of the multi-layer stack 100. The imaging system 224 may include image processing capabilities to identify a de-lamination, a stain, an etch pit, a wrinkle, a fissure, a crack, a hole, an opening, a gap, a slit, a groove, a break, a fracture, a split, a fault, or other shapes associated with the one or more defects 120. The imaging system 224 may be able to process both bright-field and dark-field images.

Still referring to FIG. 2, during normal operations, the one or more light sources 240 of the defect identification system 200 may emit the lights 260 toward the multi-layer stack 100. For example, the wavelength of the lights 260 may be 300 nanometers (nm), 400 nm, 500 nm, 600 nm, 700 nm, 800 nm, 900 nm, 1 micrometer (μm), 2 μm, 5 μm, 10 μm, 20 μm, 50 μm, 100 μm, 200 μm, 500 μm, or 1 millimeter (mm). Other wavelengths are possible. The wavelength of the lights 260 may be narrowband such that the reflected light is also narrowband. Alternatively or additionally, the lights 260 may be broadband in wavelength and narrowband filters may be disposed in front of the detector 230 and/or in front of the one or more light sources 244.

By controlling the wavelength of the incident light or selecting the wavelength of light being detected relative to the absorption (band gap) of the material, light 260 interacting with the handle 102, the one or more bottom electrodes 104, the semiconductor layer 108, the window layer 110, the one or more top electrodes 112, or a combination thereof may be selected. One or more of the response light 262 may include reflected light. The response light 262 may be reflected from a layer within the multi-layer stack 100 or the light produced by the interference of the 260 reflected off of layers in the multi-layer stack 100. The response light 262 may include the photoluminescence light radiated from portions of the multi-layer stack 100 when the light 260 impinges on the portions of the multi-layer stack 100. The response light 262 may be detected by the detector 230.

In certain aspects, the detector 230 may receive the response light 262 to detect the one or more defects 120 on the multi-layer stack 100. The detector 230 may detect lights having wavelengths of 300 nm, 400 nm, 500 nm 600 nm, 700 nm, 800 nm, 900 nm, 1 μm, 2 μm, 5 μm, 10 μm, 20 μm, 50 μm, 100 μm, 200 μm, 500 μm, or 1 mm. In one non-limiting example, the detector 230 may detect the one or more defects 120 by detecting the photoluminescence of the semiconductor layer 110.

In other implementations, the defect identification system 200 may optionally be integrated with a deposition system (e.g., electro-plating system, a sputter, an evaporator, etc.), a cutting system (e.g., dicing, laser cutting, waterjet cutting, etc.), an etching system (e.g., dry etching, wet etching), and/or a probing system.

In a non-limiting example, the one or more light sources 240 may emit the lights 260a having a high angle (e.g., greater than 45° from the surface of the multi-layer stack 100). The one or more light sources 240 may be used for the dark field imaging of the multi-layer stack 100. In the well-known art of dark field imaging, a blocked portion of the one or more light sources 240 may be blocked by a patch stop (not shown). An unblocked portion of the one or more light sources 240 may illuminate the multi-layer stack 100. Diffracted light from the unblocked portion of the one or more light sources 240 may be filtered (by an aperture/field stop, not shown) and collected by an objective lens to generate the dark field image. The high angle of the lights 260a may be conducive dark field imaging because the diffracted light may be collected by the aperture/objective lens. In other implementations, bright field and dark field illuminations may also be produced by orienting illuminations in different configuration. The bright field image may be formed by imaging an illuminated beam after reflection or transmission. On the other hand, dark field image may be produced by forming image with scattered or diffracted beams.

In some implementations, the one or more light sources 242 may emit the lights 260b having a low angle (e.g., less than 45°, 30°, 15°, or 5° from the surface of the multi-layer stack 100). The one or more light sources 242 may be used for photoluminescence (PL) imaging of the multi-layer stack 100. In PL imaging, an excitation light source of a wavelength, such as the one or more light sources 242, with energy above the bandgap of the material (e.g., one of the layers of the multi-layer stack 100) may illuminate the material. A camera, such as the detector 230, with a filter may be configured to image the PL emission which includes light having wavelengths at energies equal or lower than the bandgap. The intensity of the excitation light source may be higher in intensity than the PL emission. Therefore, it may be important to avoid specular reflection of the excitation light into the imaging optics. Although a filter is typically configured to reject the excitation light, there is a finite degree of leakage of excitation light past the filter which could be sufficient in intensity to bleach out the PL emission signal. Therefore, in some aspects of the present disclosure, it may be desirable to orient the lights 260 at a low angle to reduce leakage of excitation light.

In certain aspects of the present disclosure, the one or more light sources 244 may emit the light 260c at an angle normal or substantially normal to the surface of the multi-layer stack 100. The one or more light sources 242 may be used for the bright field imaging of the multi-layer stack 100.

In some examples, at least one of the one or more light sources 240, 242, 244 may emit narrow-band light (e.g., narrowband light) at a specific wavelength. For example, the one or more light sources 240, 242, 244 may contain one or more arrays of light emitting diodes (LEDs) which could be turned on individually emit lights of different wavelengths.

In other implementations, at least one of the one or more light sources 240, 242, 244 may emit polychromatic or broadband light at more than one wavelength. The detector 230 may be a near-infrared (NIR) camera, a charge-coupled device camera, a photodetector camera, or any suitable detector/sensor that captures light having one or more wavelengths. The detector 230 may optionally include a number of high-pass filters, low-pass filters, and/or band-pass filters for filtering the light captured by the detector 230. In one example, a filter wheel having one or more high-pass filters, low-pass filters, and/or band-pass filters may be used to filter the light captured by the detector 230.

Figure 3:
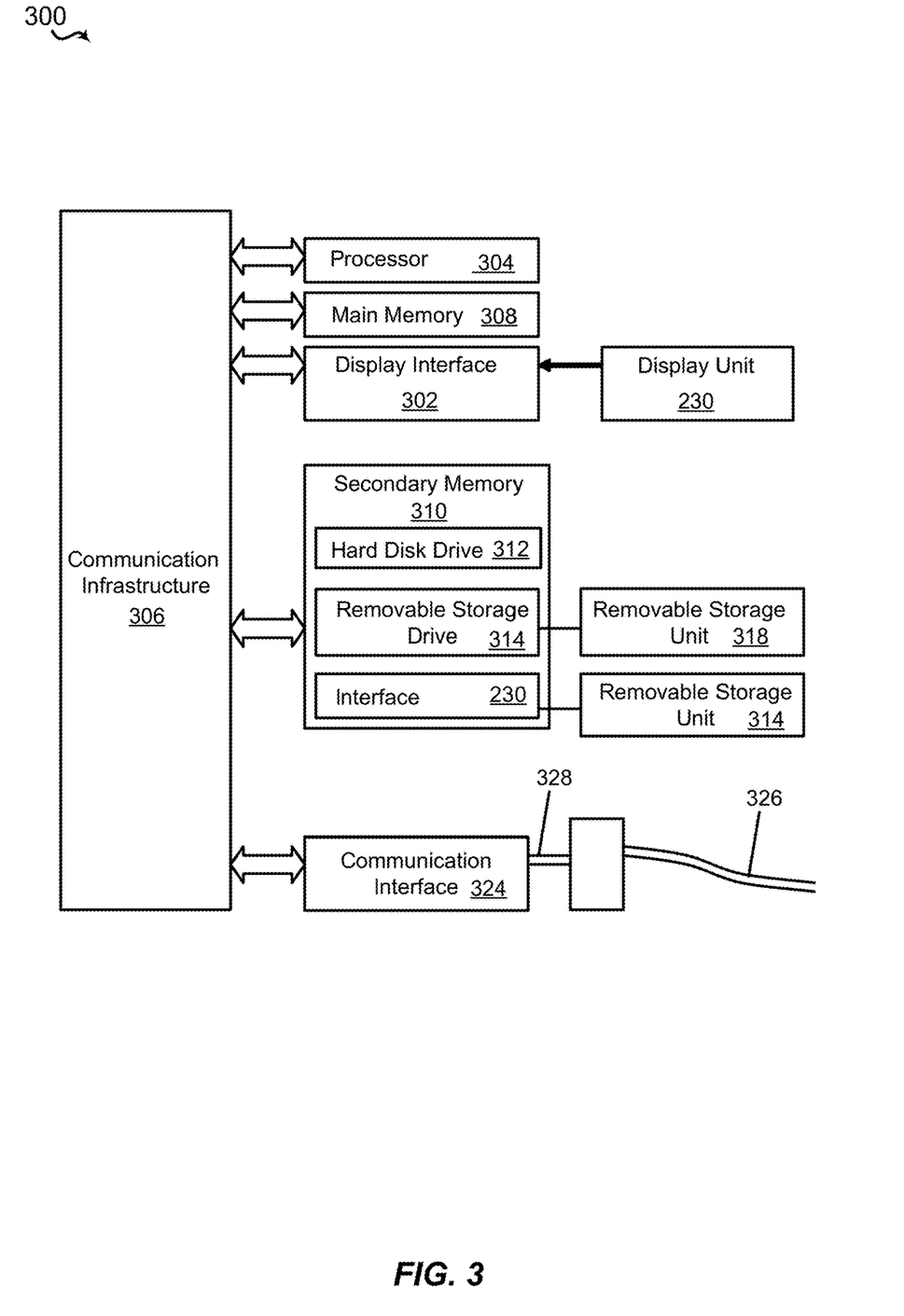
FIG. 3 is an example of a schematic diagram of an example of a computer system for implementing the defect identification system.

Referring now to FIG. 3, the control system 220 may be implemented as an example of a computer system 300. The computer system 300 may be a hardware system, a virtual system, a cloud-based system, or a combination thereof. The computer system 300 includes one or more processors, such as the processor 304. The processor 304 is communicatively coupled with a communication infrastructure 306 (e.g., a communications bus, cross-over bar, or network).

The computer system 300 may include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312, and/or a removable storage drive 314, representing a floppy disk drive, magnetic tape drive, optical disk drive, universal serial bus (USB) flash drive, etc. The removable storage drive 314 reads from and/or writes to a first removable storage unit 318 in a well-known manner. The first removable storage unit 318 represents a floppy disk, magnetic tape, optical disk, USB flash drive etc., which is read by and written to removable storage drive 314. As will be appreciated, the first removable storage unit 318 includes a computer usable storage medium having stored therein computer software and/or data.

Alternative aspects of the present disclosure may include secondary memory 310 and may include other similar devices for allowing computer programs or other instructions to be loaded into computer system 300. Such devices may include, for example, a second removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units (not shown) and interfaces 320, which allow software and data to be transferred from the second removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using one or more of a wire or cable, fiber optics, telephone line, cellular link, RF link and/or other communications channels. In this document, the terms "computer program medium" and "computer usable medium" are used to refer generally to media such as the first removable storage drive 318, a hard disk installed in hard disk drive 312, and signals 328. These computer program products provide software to the computer system 300. Aspects of the present disclosure are directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features in accordance with aspects of the present disclosure, as discussed herein. In particular, the computer programs, when executed, enable the processor 304 to perform the features in accordance with aspects of the present disclosure. Accordingly, such computer programs represent controllers of the computer system 300.

In an aspect of the present disclosure where the method is implemented using software, the software may be stored in a computer program product and loaded into computer system 300 using removable storage drive 314, hard drive 312, or communications interface 320. The control logic (software), when executed by the processor 304, causes the processor 304 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 4:
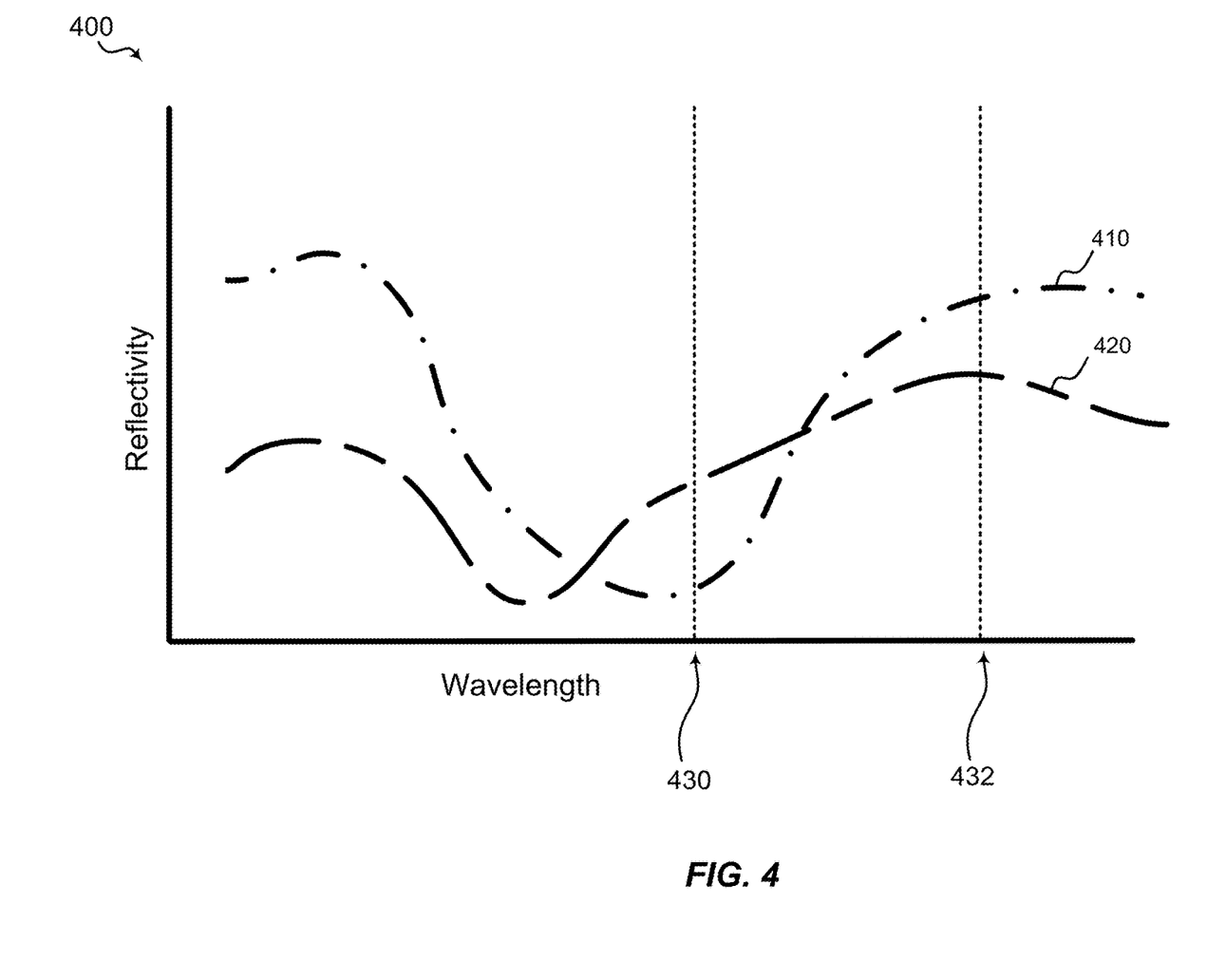
FIG. 4 is an example of a graph showing the optical response of the multi-layer stack according to aspects of the present disclosure.

Referring now to FIG. 4 and referencing FIG. 1, in some instances of the present disclosure, an example of an optical response versus wavelength diagram 400 may include a first curve 410 representing the optical response of a first region (without defect) of the multi-layer stack 100 and a second curve 420 representing the optical response of the one or more defects 120 in the semiconductor layer 108. At a first wavelength 430, the second curve 420 has a higher optical response than the first curve 410. At a second wavelength 432, the first curve 410 has a higher optical response than the second curve 420. Therefore, when illuminating the multi-layer stack 100 with a light at the first wavelength 430, the one or more defects 120 may appear brighter than the regions without defect due to higher optical response. When illuminating the multi-layer stack 100 with a light at the second wavelength 432, the one or more defects 120 may appear dimmer than the regions without defect due to lower optical response.

Figure 5:
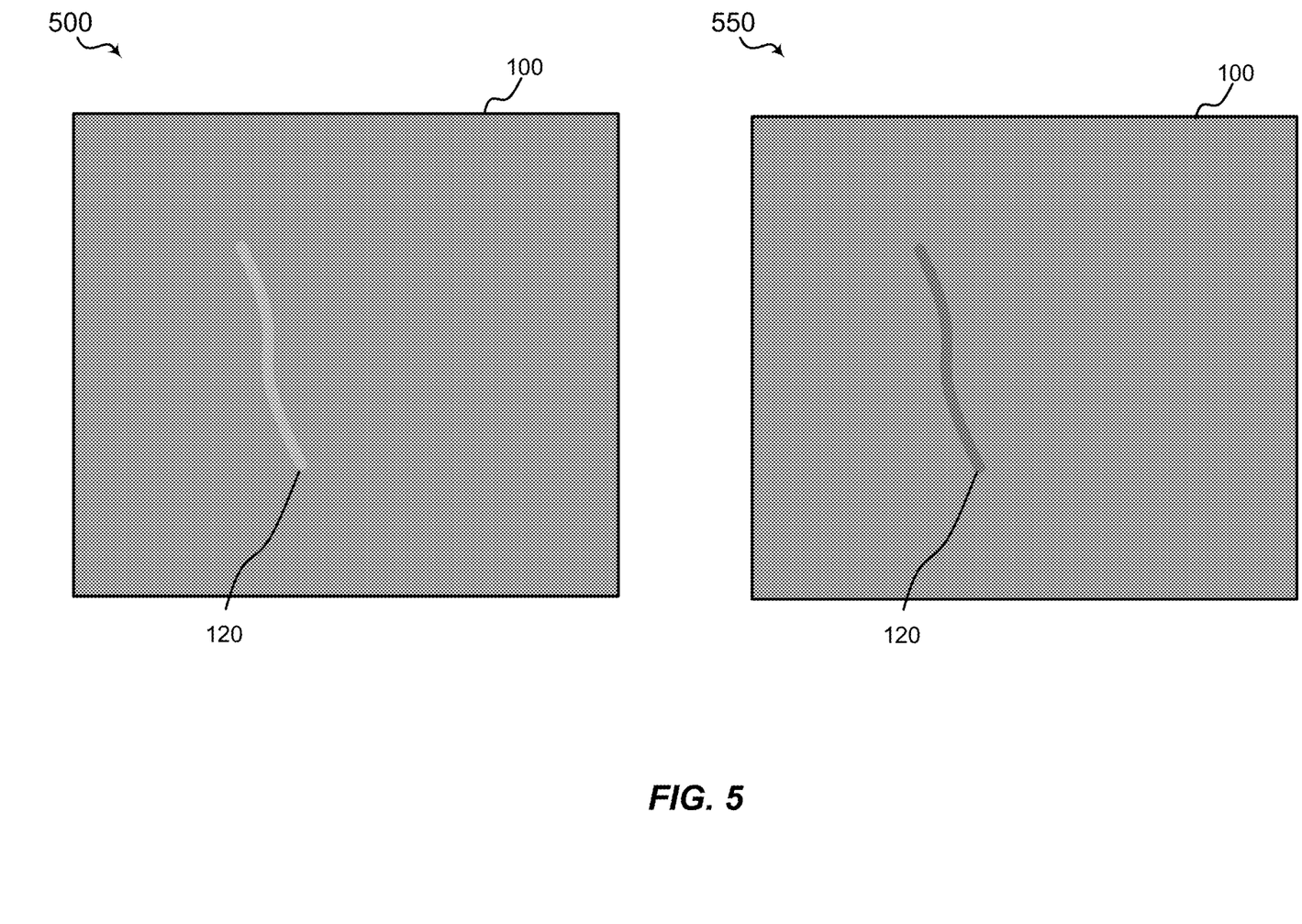
FIG. 5 illustrates examples of images showing defects according to aspects of the present disclosure.

Turning now to FIG. 5 and referencing FIGS. 1 and 4, in some implementations, an example of a first image 500 may be an image of the multi-layer stack 100 captured by the detector 230 at the first wavelength 430. The at least one of the one or more light sources 240, 242, 244 may emit the lights 260 at the first wavelength 430. Alternatively or additionally, the detector 230 may only detect lights at or near the first wavelength 430, and substantially filter out lights at wavelengths other than the first wavelength 430. As shown in the first curve 410, the portions of the multi-layer stack 100 without the one or more defects 120 have a lower optical response than the one or more defects 120. Therefore, the first image 500 may show the one or more defects 120 reflecting more light (appearing lighter or brighter) than the portions of the multi-layer stack 100 without the one or more defects 120.

In some implementations, an example of a second image 550 may be an image of the multi-layer stack 100 captured by the detector 230 at the second wavelength 432. The at least one of the one or more light sources 240, 242, 244 may emit the lights 260 at the second wavelength 432. Alternatively or additionally, the detector 230 may only detect lights at or near the second wavelength 432, and substantially filter out lights at wavelengths other than the second wavelength 432. As shown in the second curve 420, the portions of the multi-layer stack 100 without the one or more defects 120 have a higher optical response than the one or more defects 120. Therefore, the second image 500 may show the one or more defects 120 reflecting less light (appearing darker) than the portions of the multi-layer stack 100 without the one or more defects 120.

Figure 6:
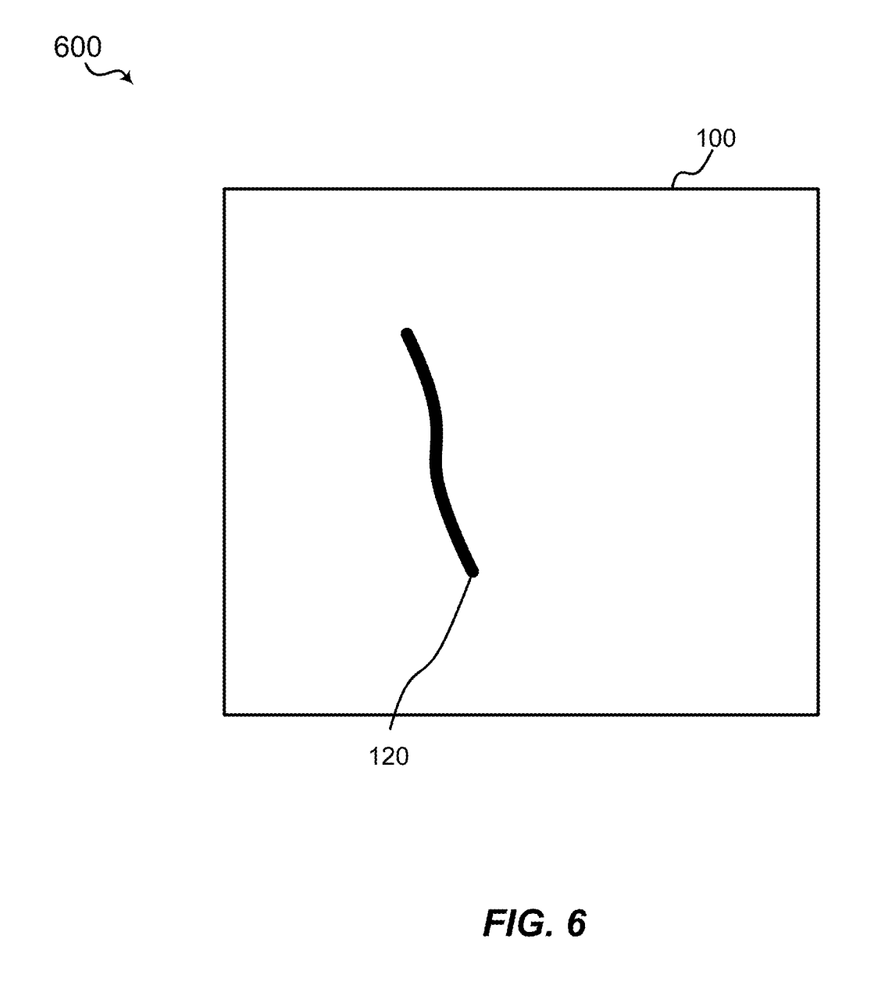
FIG. 6 illustrates an example of a processed image according to aspects of the present disclosure.

Turning to FIG. 6, in some implementations, a processed image 600 may be generated by the imaging system 224. For example, the imaging system 224 may perform image processing by subtracting or dividing the second image 550 by the first image 500 to generate the processed image 600. Specifically, the imaging system 224 may perform the image processing by subtracting or dividing the digital/numerical representations of the pixel values in the second image 550 by the corresponding digital/numerical representations of the pixel values in the first image 500. For example, the imaging system 224 may divide or subtract the pixel values of the one or more defects 120 in the second image 550 by the pixel values of the one or more defects 120 in the first image 500. Further, the imaging system 224 may divide or subtract the pixel values of the area outside of the one or more defects 120 in the second image 550 by the pixel values of the area outside the one or more defects 120 in the first image 500. The resulting quotients or differences may enhance the one or more defects 120 (darker).

In some instances, the image processing may enhance the one or more defects 120 in the processed image 600. The enhancement may enhance the contrast so the one or more defects 120 may be more easily detected. The imaging system 224 may be configured to perform image processing to identify the one or more defects 120. For example, the imaging system 224 may identify the one or more defects 120 based on the color, shape, outline, contour, edge, transparency, or other features.

In certain aspects, photo luminesce images may be combined with the multi-band imaging to further enhance the defect identification. In addition to reflection, transmitted light incident on the multi-layer stack may interact with the multi-layer stack by scattering, interfering, refracting, and luminescing.

Referring back to FIGS. 1 and 2, in certain implementations, the imaging system 224 may cause the one or more light sources 240, 242, 244 to emit one or more of the lights 260 at a wavelength with energy lower than the bandgap of the semiconductor layer 108. The lights 260 may pass through the semiconductor layer 108 without being absorbed by the semiconductor 108. However, the lights 260 may interact (e.g., being absorbed, refracted, diffracted, re-emitted, etc.) with at least one of the handle 102, the one or more bottom electrodes 104, the window layer 110, or the one or more top electrodes 112. In one example, the imaging system 224 may cause the one or more light sources 240, 242, 244 to emit the lights 260 near the NIR, mid-infrared, or far-infrared. In response to the lights 260 interacting with the at least one of the handle 102, the one or more bottom electrodes 104, the window layer 110, or the one or more top electrodes 112, the response light 262 may reflect off of the at least one of the handle 102, the one or more bottom electrodes 104, the window layer 110, or the one or more top electrodes 112. The detector 230 may capture the response light 262 and generate an image.

Figure 7:
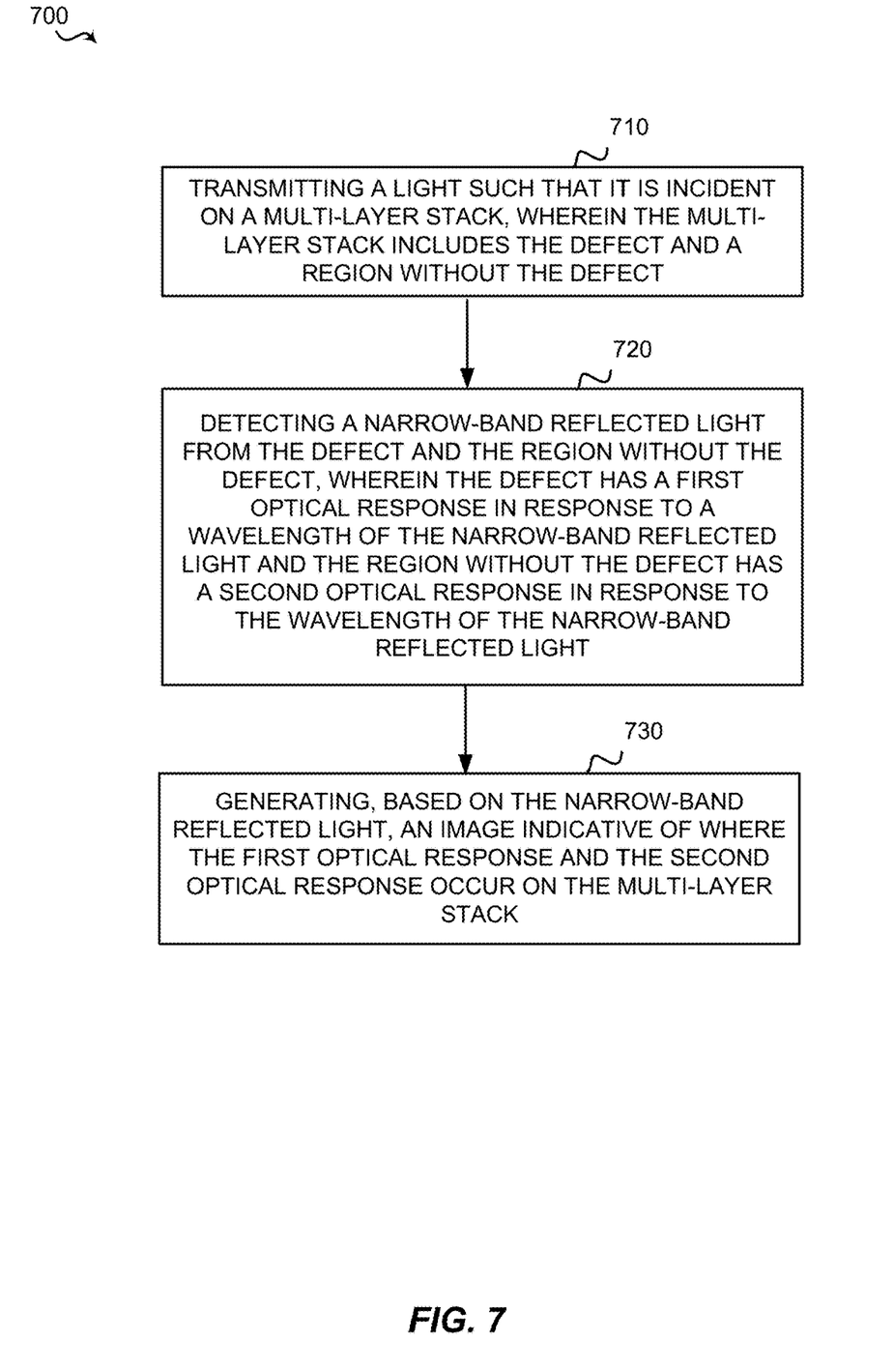
FIG. 7 is an example of a process flow diagram of defect identification according to aspects of the present disclosure.

Referring to FIG. 7, an example of a method 700 for reducing defects may be performed by the one or more light sources 240, 242, 244, the detector 230, the control system 220, the imaging system 224, or associated hardware and/or software of the defect identification system 200.

At block 710, the method 700 may transmits a light such that it is incident on a multi-layer stack, wherein the multi-layer stack includes the defect and a region without the defect. For example, the imaging system 224 may cause the one or more light sources 240, 242, 244 to transmit one or more of the light 260 toward the multi-layer stack 100, which includes the one or more defects 120 and the portions of the multi-layer stack 100 without the one or more defects 120.

At block 720, the method 700 may detect a narrow-band reflected light from the defect and the region without the defect, wherein the defect has a first optical response in response to a wavelength of the narrow-band reflected light and the region without the defect has a second optical response in response to the wavelength of the narrow-band reflected light. For example, the detector 230 may detect the response light 262 at the first wavelength 430 or the second wavelength 432.

At block 730, the method 700 may generate, based on the narrow-band reflected light, an image indicative of where the first optical response and the second optical response occur on the multi-layer stack. For example, the imaging system 324 may generate at least one of the first image 500 based on the response light 262 at the first wavelength 430 or the second image 5500 based on the response light 262 at the second wavelength 432.

In alternative implementations, the techniques described above may be used to identify features in the multi-layer stack 100. The features may include defects, metal contacts, vias, mesas, packaging, etc.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of identifying a feature, comprising:
   transmitting a first light such that the first light is incident on a multi-layer stack, wherein the multi-layer stack includes the feature and a region without the feature;
   transmitting a second light such that it is incident on the multi-layer stack;
   detecting a first narrow-band light reflected from the feature and the region without the feature, wherein the feature has a first reflectance in a first wavelength of the narrow-band light and the region without the feature has a second reflectance in the first wavelength of the first narrow-band light;
   detecting a second narrow-band light reflected from the feature and the region without the feature, wherein the feature has a third reflectance in a second wavelength of the second narrow-band light and the region without the feature has a fourth reflectance in the second wavelength of the second narrow-band light, wherein the second narrow-band light has the second wavelength different from the wavelength;
   generating, based on the narrow-band light, a first image indicative of where the first reflectance and the second reflectance occur on the multi-layer stack;
   generating, based on the second narrow-band light, a second image indicative of where the third reflectance and the fourth reflectance occur on the multi-layer stack; and
   subtracting or dividing the first image by the second image or the second image by the first image to generate a processed image.

2. The method of claim 1, further comprises identifying the feature based on where the first reflectance is indicated to occur on the multi-layer stack by the image.

3. The method of claim 1, wherein a first illumination angle of the first light is higher than a second illumination angle of the second light.

4. The method of claim 1, further comprises identifying the feature based on a contrast in pixel intensity in the processed image between the feature and the region without the feature.

5. The method of claim 1, further comprises:
   transmitting a third light such that it is incident on the multi-layer stack;
   detecting a photo-luminescent light from the feature and the region without the feature, wherein the feature has a first photo-luminescent characteristic in response to the third light and the region has a second photo-luminescent characteristic in response to the third light; and
   generating, based on the photo-luminescent light, a photo-luminescent image indicative of where the first photo-luminescent characteristic and the second photo-luminescent characteristic occur on the multi-layer stack.

6. The method of claim 5, further comprises identifying the feature based on the photo-luminescent image.

7. The method of claim 1, wherein the first light is a narrow-band light.

8. The method of claim 1, wherein the first wavelength of the first light is lower in energy than a bandgap of at least a layer of layers in the multi-layer stack.

9. The method of claim 1, wherein:
   the first light is a broadband light; and
   a broadband response light is generated in response to the broadband light impinging on the feature and the region without the feature;
   further comprising filtering the broadband response light to generate the first narrow-band light and the second narrow-band light.

10. A feature identification system, comprising:
    one or more light sources configured to:
       transmit a first light such that it is incident on a multi-layer stack, wherein the multi-layer stack includes the feature and a region without the feature; and
       transmit a second light such that it is incident on the multi-layer stack;
    one or more detectors configured to:
       detect a first narrow-band light reflected from the feature and the region without the feature, wherein the feature has a first reflectance in response to a first wavelength of the first narrow-band light and the region without the feature has a second reflectance in response to the first wavelength of the first narrow-band light; and
       detect a second narrow-band light reflected from the feature and the region without the feature, wherein the feature has a third reflectance in response to a second wavelength of the second narrow-band light and the region without the feature has a fourth reflectance in response to the second wavelength of the second narrow-band light, wherein the second narrow-band light has the second wavelength different from the wavelength; and
    an imaging system configured to:
       generate, based on the first narrow-band light, a first image indicative of where the first reflectance and the second reflectance occur on the multi-layer stack;
       generate, based on the second narrow-band light, a second image indicative of where the third reflectance and the fourth reflectance occur on the multi-layer stack; and subtract or divide the first image by the second image or the second image by the first image to generate a processed image.

11. The feature identification system of claim 10, wherein the imaging system is further configured to identify the feature based on where the first reflectance is indicated to occur on the multi-layer stack by the image.

12. The feature identification system of claim 10, wherein a first illumination angle of the light is higher than a second illumination angle of the second light.

13. The feature identification system of claim 10, wherein the imaging system is further configured to identify the feature based on a contrast in pixel intensity in the processed image between the feature and the region without the feature.

14. The feature identification system of claim 10, wherein:
the one or more light sources is further configured to transmit a third light such that it is incident on the multi-layer stack;
the detector is further configured to detect a photo-luminescent light from the feature and the region without the feature, wherein the feature has a first photo-luminescent characteristic in response to the third light and the region has a second photo-luminescent characteristic in response to the third light; and
the imaging system is further configured to generate, based on the photo-luminescent light, a photo-luminescent image indicative of where the first photo-luminescent characteristic and the second photo-luminescent characteristic occur on the multi-layer stack.

15. The feature identification system of claim 14, wherein the imaging system is further configured to identify the feature based on the photo-luminescent image.

16. The feature identification system of claim 10, wherein the first light is a narrow-band light.

17. The feature identification system of claim 10, wherein the first wavelength of the first light is lower in energy than a bandgap of at least a layer of layers in the multi-layer stack.

18. The feature identification system of claim 10, wherein:
the first light is a broadband light; and
a broadband reflected light is generated in response to the broadband light impinging on the feature and the region without the feature;
further comprising a plurality of optical filters configured to filter the broadband reflected light to generate the first narrow-band light and the second narrow-band light.

19. The feature identification system of claim 18, further comprises two or more high-pass filters, low-pass filters, or band-pass filters configured to filter the broadband reflected light to generate the first narrow-band light and the second narrow-band light.

* * * * *